(12) United States Patent
Eglin et al.

(10) Patent No.: US 11,292,589 B2
(45) Date of Patent: Apr. 5, 2022

(54) METHOD OF AUTOMATICALLY ADJUSTING LIFT PROVIDED FOR A HYBRID ROTORCRAFT, AND AN ASSOCIATED HYBRID ROTORCRAFT

(71) Applicant: AIRBUS HELICOPTERS, Marignane (FR)

(72) Inventors: Paul Eglin, Roquefort la Bedoule (FR); Remy Huot, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/172,232

(22) Filed: Feb. 10, 2021

(65) Prior Publication Data

US 2021/0284331 A1 Sep. 16, 2021

(30) Foreign Application Priority Data

Mar. 16, 2020 (FR) ........................ 2002564

(51) Int. Cl.
*B64C 27/00* (2006.01)
*B64C 27/26* (2006.01)
(Continued)

(52) U.S. Cl.
CPC .............. *B64C 27/26* (2013.01); *B64C 27/57* (2013.01); *G05D 1/0858* (2013.01); *B64C 2027/8236* (2013.01)

(58) Field of Classification Search
CPC . B64C 27/26; B64C 27/57; B64C 2027/8236; B64C 9/00; B64C 13/18; G05D 1/0858
See application file for complete search history.

(56) References Cited

U.S. PATENT DOCUMENTS

| 8,052,094 B2 | 11/2011 | Roesch |
| 8,668,162 B1 | 3/2014 | Sonneborn |

(Continued)

FOREIGN PATENT DOCUMENTS

| EP | 2666718 A1 | 11/2013 |
| EP | 2990684 A1 | 11/2013 |
| EP | 3118112 A1 | 1/2017 |

OTHER PUBLICATIONS

French Search Report for French Application No. FR2002564, Completed by the French Patent Office, dated Nov. 6, 2020, 9 pages.

*Primary Examiner* — Ian Jen
(74) *Attorney, Agent, or Firm* — Brooks Kushman P.C.

(57) ABSTRACT

A method of automatically adjusting lift in a hybrid rotorcraft, the hybrid rotorcraft including a fuselage and at least two half-wings on either side of the fuselage, the at least two half-wings including at least one left half-wing having a left fixed structure secured to the fuselage and at least one left flap mounted to move relative to the left fixed structure, and at least one right half-wing having a right fixed structure secured to the fuselage and at least one right flap mounted to move relative to the right fixed structure. The method determines at least one first deflection angle setpoint $\delta w1$ by which the at least one left flap is to be deflected relative to the left fixed structure and at least one second deflection angle setpoint $\delta w2$ by which the at least one right flap is to be deflected relative to the right fixed structure.

12 Claims, 4 Drawing Sheets

(51) Int. Cl.
  *B64C 27/57* (2006.01)
  *G05D 1/08* (2006.01)
  *B64C 27/82* (2006.01)

(56) References Cited

U.S. PATENT DOCUMENTS

| | | | |
|---|---|---|---|
| 10,421,538 B2 * | 9/2019 | Seale | ............... B64C 27/24 |
| 2014/0084105 A1 | 3/2014 | Eglin | |
| 2014/0084106 A1 | 3/2014 | Eglin | |
| 2017/0113793 A1 | 4/2017 | Toulmay | |

* cited by examiner

METHOD OF AUTOMATICALLY ADJUSTING LIFT PROVIDED FOR A HYBRID ROTORCRAFT, AND AN ASSOCIATED HYBRID ROTORCRAFT

CROSS-REFERENCE TO RELATED APPLICATIONS

This application claims priority to French patent application No. FR 20 02564 filed on Mar. 16, 2020, the disclosure of which is incorporated in its entirety by reference herein.

BACKGROUND OF THE INVENTION

(1) Field of the Invention

The project leading to this invention received funding from the European Union Framework Programme for Research and Innovation Horizon 2020, through the grant agreement CleanSky 2 No. «GAM-FRC-2014-001 Issue E.

The present invention relates to the general technical field of the flight mechanics of a rotary-wing aircraft. More specifically, it relates to a method of automatically adjusting lift provided for a hybrid rotorcraft. Such hybrid rotorcraft are rotary-wing aircraft that are additionally equipped with at least one propeller of the pusher type or of the puller type.

(2) Description of Related Art

A rotorcraft conventionally has at least one main rotor, providing both lift and propulsion for the aircraft, a fuselage, and a power plant for driving the main rotor(s) in rotation.

As described in Documents FR 2 990 684 and EP 2 666 718, such hybrid rotorcraft can thus also include firstly one or more pusher or puller propellers and secondly a lift surface comprising at least two half-wings situated on either side of an anteroposterior midplane of the fuselage.

For example, two variable-pitch pusher propellers may be positioned on either side of said anteroposterior midplane of the fuselage, each propeller co-operating with one or two half-wings for securing them to the fuselage.

In addition, each half-wing may be equipped with at least one fixed structure secured to the fuselage and with at least one movable flap serving to modify the lift provided by each half-wing and thus more generally the lift provided for the hybrid rotorcraft.

The main function of the two half-wings is thus to participate in providing lift for the hybrid rotorcraft during a phase of flight at high forward speed, the pusher or puller propellers, for their part, enabling such a forward speed to be achieved. Conversely, the term "moderate-speed flight" may be used for flight phases of maneuvering and/or of flying at forward speeds less than cruising flight speed.

Furthermore, during a phase of flight at high forward speed, the flap(s) of each half-wing can serve to adjust the balance of the aircraft in pitch using predefined criteria relating, for example, to the trim or attitude of the aircraft or indeed to the bending moment of the mast of the main rotor. In this configuration, the half-wings participate in providing the total lift for the aircraft that is necessary for the aircraft to fly. Therefore, the main rotor provides the hybrid rotorcraft with some fraction of the lift it needs during a phase of flight at high forward speed, optionally while also contributing to propelling it forwards.

Piloting such a hybrid rotorcraft during a phase of flight at high forward speed can require specific controls in order to modify the lift provided by the half-wings as well as the pitches of the propellers.

Consequently, during a phase of flight at high forward speed, the workload on the pilot is considerable and complex in order to cope with handling the specific controls of the hybrid rotorcraft in addition to the conventional controls of a rotary-wing aircraft.

Furthermore, Document U.S. Pat. No. 8,052,094 discloses a hybrid rotorcraft and a control method implementing various control laws enabling lift provided by the horizontal stabilizer of that rotorcraft to be adapted.

Document EP 3 118 112 discloses a compound aircraft provided with two wings, each wing having a movable flap situated at a trailing edge. Such flaps enable longitudinal aerodynamic forces to be generated in opposite directions on either side of the fuselage and therefore additional torque to be generated in addition to the main torque produced by the tail rotor.

BRIEF SUMMARY OF THE INVENTION

An object of the present invention is therefore to propose an alternative method that aims to adjust automatically lift provided for a hybrid rotorcraft. Such an adjustment method enables the above-mentioned limitations to be overcome, in particular by optimizing the level of performance of a hybrid rotorcraft as a function of the flight conditions and of the weight of said rotorcraft.

The invention therefore provides a method of automatically adjusting lift provided for a hybrid rotorcraft, the hybrid rotorcraft including:

a fuselage;
at least one main rotor provided with a plurality of blades, the main rotor(s) rotating relative to the fuselage at a speed of rotation NR;
at least one pusher or puller propeller; and
at least two half-wings positioned on either side of an anteroposterior midplane of the fuselage, the at least two half-wings including firstly at least one left half-wing having a left fixed structure secured to the fuselage and at least one left flap mounted to move relative to the left fixed structure, and secondly at least one right half-wing having a right fixed structure secured to the fuselage and at least one right flap mounted to move relative to the right fixed structure.

The method includes, during a nominal flight phase, a step consisting in automatically adjusting lift provided by said at least two half-wings.

In accordance with the invention, the method is remarkable in that this step includes a succession of substeps consisting in:

computing a forward propulsion parameter as a function firstly of a true air speed TAS and secondly of a current value of said speed of rotation NR;
determining a target lift coefficient $Czm^*$ for the main rotor, the target lift coefficient $Czm^*$ being a function of the forward propulsion parameter;
computing target lift $F_{rotor}^*$ to be provided by the main rotor, said target lift $F_{rotor}^*$ to be provided by the main rotor being a function of the current value of the speed of rotation NR, of current atmospheric conditions, and of the target lift coefficient $Czm^*$;
computing target lift $F_{wing}^*$ to be provided by the at least two half-wings, the target lift $F_{wing}^*$ to be provided by the at least two half-wings being a function of the target lift $F_{rotor}^*$ to be provided by the main rotor and of a current value of the weight of the hybrid rotorcraft; and
determining at least one first deflection angle setpoint $\delta w1$ by which the left flap or each left flap is to be deflected relative to the left fixed structure and at least one second deflection angle setpoint δw2 by which the right flap or each right flap is to be deflected relative to the right fixed structure, the at least one first and at least one second deflection angle setpoints δw1, δw2 being functions of the target lift $F_{wing}^*$ to be provided by the at least two half-wings and of aerodynamic coefficients of the at least two half-wings.

In other words, such a method serves, as a function of the forward propulsion parameter of the hybrid rotorcraft, to cause automatic variation in the angular positioning of the left flap(s) arranged on the left half-wing and in the angular positioning of the right flap(s) arranged on the right half-wing.

The first deflection angle setpoint δw1 and the second deflection angle setpoint δw2 may advantageously be generated by a computer of a control system. Such a computer then transmits the first deflection angle setpoint δw1 and the second deflection angle setpoint δw2 to actuators, such as, in particular, electrically controlled actuators, so as to adapt the deflection angles of the left flap(s) relative to the left fixed structure and of the right flap(s) relative to the right fixed structure.

If necessary, these actuators then enable an angular position of the left or right flap(s) relative to a left or right fixed structure to be modified by causing the left or right flap(s) to move in rotation about one or more axes of rotation.

The left or right flap or each of the left or right flaps thus has at least one degree of freedom to move in rotation relative to a left or right fixed structure. The axis of rotation of each pivot coupling of the left or right flaps may advantageously be arranged at a trailing edge of an aerodynamic profile of each half-wing.

Furthermore, the forward propulsion parameter of the rotorcraft, the target lift coefficient $Czm^*$ for the main rotor, and the target lift $F_{rotor}^*$ for the main rotor represent different intermediate computation values computed by one or more computers and enabling the at least one first and at least one second deflection angle setpoints δw1, δw2 to be determined.

Conversely, the true air speed TAS of the rotorcraft, the current value of the speed of rotation NR, the current atmospheric conditions, such as, in particular pressure and temperature, and the current value of the weight of the hybrid rotorcraft are quantities that can be measured or indeed estimated by means of various sensors equipping the hybrid rotorcraft. Furthermore, these various sensors are connected in wired or wireless manner to the computer of the control system of the hybrid rotorcraft, and they transmit data continuously or cyclically to the computer, which data may, in particular, be of the analog type or of the digital type.

Furthermore, the current value of the weight of the hybrid rotorcraft may be computed at each instant by subtracting the weight of fuel consumed by the rotorcraft from the initial weight estimated and input by the crew so as to be recorded in the control system of the rotorcraft.

In addition, the target lift coefficient $Czm^*$ for the main rotor may, in particular, be identified in a table of values that is defined by in-flight trials, by simulations, or indeed by aerodynamic trials.

Similarly, for example, the at least one first and at least one second deflection angle setpoints δw1, δw2 may be determined by means of aerodynamic coefficients related to the lift provided by the flap(s). These aerodynamic coefficients may be established in different ways such as by measurements in wind tunnels, by computer programs suitable for performing simulations and using, in particular, the principles of fluid mechanics, or by in-flight trials.

For example, in order to determine the first and second deflection angle setpoints by which the flaps are to be deflected, it is possible to use a first lift coefficient $SCz_{\delta w=0}$ for the wing that corresponds to the flaps having a deflection angle of zero. Furthermore, such a first lift coefficient $SCz_{\delta w=0}$ depends on the angle of incidence alpha between a chord of an aerodynamic profile of the wing and the direction of the wind relative to this aerodynamic profile.

The first and second deflection angle setpoints δw1, δw2 by which the flaps are to be deflected may also depend on the effectiveness of the flaps that corresponds to a derivative of the lift defined by the expression $$\frac{\partial SCz}{\partial \delta w}.$$

Thus, such a lift coefficient for the wing may be computed using the following formula:

$$SCz = SCz_{\delta w=0} + \frac{\partial SCz}{\partial \delta w} \times \delta w$$

As a result, with the lift need SCz being known, the first and second deflection angle setpoints δw1, δw2 can be computed.

In addition, such aerodynamic coefficients may also be corrected as a function of certain parameters for interactions between the main rotor and each half-wing, or indeed between a pusher or puller propeller and the half-wing to which said pusher or puller propeller is secured.

Cyclically or from time to time, the control system may then generate at least one first and at least one second deflection angle setpoints δw1, δw2 in such a manner as to optimize the performance of the hybrid rotorcraft automatically.

Advantageously, the lift provided by the at least two half-wings may be adjusted when the following condition is satisfied:

$$\frac{F_{rotor}*}{F_{rotor}*+F_{wing}*} > S$$

where S is a predetermined threshold value representative of a minimum allowable contribution from the main rotor to the total lift provided for the hybrid rotorcraft.

In other words, the predetermined threshold value S may be obtained on the basis of simulations, of computation, or of in-flight trials.

Such a predetermined threshold value S then enables the deflection angle of the flap(s) to be limited and the lift provided by the wing to be prevented from being predominant compared with the lift provided by the main rotor.

In practice, the lift provided by the at least two half-wings may be adjusted when the one or more first setpoints δw1 are strictly less than a first predetermined threshold value δwmax1 representative of a maximum allowable deflection for the left flap(s) and the one or more second setpoints δw2 are strictly less than a second predetermined threshold value δwmax2 representative of a maximum allowable deflection for the right flap(s).

Furthermore, such predetermined threshold values δwmax1 and δwmax2 are also obtained on the basis of simulations, of computation, or of in-flight trials. They may be constant or be variable as a function of various parameters such as atmospheric pressure, or altitude, or indeed they may be parameterizable by a pilot, e.g. as a function of the type of mission to be flown by the hybrid rotorcraft.

In one implementation of the invention, the target lift $F_{rotor}*$ to be provided by the main rotor may be computed by means of the following formula:

$$Frotor* = \frac{Czm* \times \rho \times b \times c \times R \times U^2}{6}$$

where:

$\rho$ is the density (mass per unit volume) of the surrounding outside air;

b is the number of blades in the plurality of blades of the main rotor or of each of the main rotors;

c is a chord of an aerodynamic profile of the blades;

R is a radius of the main rotor or of each of the main rotors; and

U is a tangential speed at the tips of the blades.

Furthermore, during a phase of flight during which the one or more main rotors are autorotating, and which is distinct from the nominal flight phase, a first predetermined threshold value δwmax1 representative of a maximum allowable deflection for the left flap(s) may be assigned to the first setpoint(s) δw1, and a second predetermined threshold value δwmax2 representative of a maximum allowable deflection for the right flap(s) may be assigned to the second setpoint(s) δw2.

In other words, the flap or each of the flaps of each half-wing may be deflected upwards until reaching a stop. Thus, the lift provided by the half-wings may be reduced and the fraction of the lift generated by the main rotor reaches its maximum. It is thus possible to facilitate a phase of flight in autorotation for the hybrid rotorcraft by maximizing the production of power provided by the main rotor.

Such an autorotation flight phase may occur in the event of failure of the engine(s) of the rotorcraft, or indeed it may be engaged intentionally by the pilot, e.g. during training in piloting, or during a test for certifying the aircraft.

Conversely, if it is not desired to give preference to autorotation by the main rotor(s), and rather to use the power recovered by the propellers, then the nominal law enabling the left flap(s) or the right flap(s) to be controlled may be complied with. The propellers then enable the hybrid rotorcraft to maintain a forward speed that is sufficient to perform such an autorotation flight phase. The propellers then enable the hybrid rotorcraft to maintain an engine speed that is sufficient by providing power to the hybrid rotorcraft and operating like wind turbines. Operation of the main rotor remains unchanged compared with a cruising flight phase, and the nominal law of the flap(s) of each half-wing must be maintained.

In addition, various operating modes of a hybrid rotorcraft may be implemented by means of such a method.

In a first operating mode, the lift provided by the at least two half-wings may be adjusted symmetrically about the anteroposterior midplane of said fuselage, the first setpoint(s) awl being equal to the second setpoint(s) δw2.

In this situation, a current value of lift provided by said main rotor may then be measured, and a closed-loop regulation may be controlled so as to adjust the lift provided by the at least two half-wings symmetrically.

Such a closed-loop regulation then serves, via a comparator, to compare the target lift $F_{wing}*$ to be provided by the at least two half-wings with the current value of the lift provided by the at least two half-wings, or alternatively to compare the target lift $F_{rotor}*$ to be provided by the main rotor with the current value of the lift provided by the main rotor. Such a closed-loop regulation thus serves to regulate the current value of the lift provided by the at least two half-wings or the current value of the lift provided by the main rotor.

In a second operating mode, when firstly said true air speed TAS is greater than a predetermined threshold value TAS1 and secondly flight parameters of the hybrid rotorcraft enable checking to be performed to check that the hybrid rotorcraft is in a stabilized flight phase, the lift provided by the at least two half-wings may be adjusted asymmetrically about the anteroposterior midplane of the fuselage, the first setpoint(s) δw1 being distinct from the second setpoint(s) δw2.

In other words, the flap(s) of the two half-wings are angularly positioned at different angular positions when the true air speed TAS of the rotorcraft is sufficient. For example, such a predetermined threshold value TAS1 may be equal to 150 knots (kt). Furthermore, the flight parameters of the hybrid rotorcraft that serve to define the stabilized flight phase of the hybrid rotorcraft may be minimum trim angles and/or reduced rates of climb or of descent. During such a stabilized flight phase, the hybrid rotorcraft then does not perform any maneuvering.

A test step for testing the activation of the second operating mode may thus be implemented by the method, and then serves to verify the two conditions related to the true air speed TAS and to the flight parameters of the hybrid rotorcraft.

In a first variant of the second operating mode, the lift provided by the at least two half-wings may be adjusted asymmetrically so that a lateral cyclic pitch of the blades of the main rotor is equal to a setpoint lateral cyclic pitch.

In other words, said first variant of the second operating mode enables the at least two deflection angle setpoints δw1, δw2 to be adjusted in such a manner as to optimize automatically a positioning of the stick for controlling the lateral cyclic pitch of the blades of the main rotor. Position sensors arranged on such a stick or on a control line then serve to measure a current position of the stick relative to a support secured to the fuselage of the hybrid rotorcraft.

In a second variant of the second operating mode, the lift provided by the at least two half-wings may be adjusted asymmetrically so that a lateral bending moment of a mast of the main rotor is equal to a setpoint lateral bending moment during the stabilized flight phase.

Such a second variant of the second operating mode enables the at least one first and second deflection angle setpoints δw1, δw2 to be adjusted in such a manner as to optimize automatically the loads on the mast of the main rotor. Sensors, such as strain gauges, arranged on the rotor mast then serve to measure or to estimate said lateral bending moment of the mast of the main rotor.

In practice, it is possible for the lift provided by said at least two half-wings to be adjusted asymmetrically in the event of malfunctioning of any one of the at least one left flap and of the at least one right flap.

In this situation, the left flap(s) or the right flap(s) still active may automatically be deflected so as to enable the target lift Fwing* that is to be provided by the at least two half-wings to be achieved or indeed so as to limit the lateral bending moment during the stabilized flight phase.

The invention also provides a hybrid rotorcraft including:
a fuselage;
at least one main rotor provided with a plurality of blades, the main rotor(s) rotating relative to the fuselage at a speed of rotation NR;
at least one pusher or puller propeller;
at least two half-wings positioned on either side of an anteroposterior midplane of the fuselage, the at least two half-wings including firstly at least one left half-wing having a left fixed structure secured to said fuselage and at least one left flap mounted to move relative to the left fixed structure, and secondly at least one right half-wing having a right fixed structure secured to the fuselage and at least one right flap mounted to move relative to the right fixed structure; and
a control system connected to the left flap(s) and to the right flap(s), the control system being configured to generate automatically at least one first deflection angle setpoint δw1 by which the left flap or each left flap is to be deflected relative to the left fixed structure, and at least one second deflection angle setpoint δw2 by which the right flap or each right flap is to be deflected relative to the right fixed structure.

In accordance with the invention, such a hybrid rotorcraft is remarkable in that the control system is configured to apply the above-described method.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

As mentioned above, the invention relates to the field of hybrid rotorcraft that are configured to fly at high cruising speeds.

Figure 1:
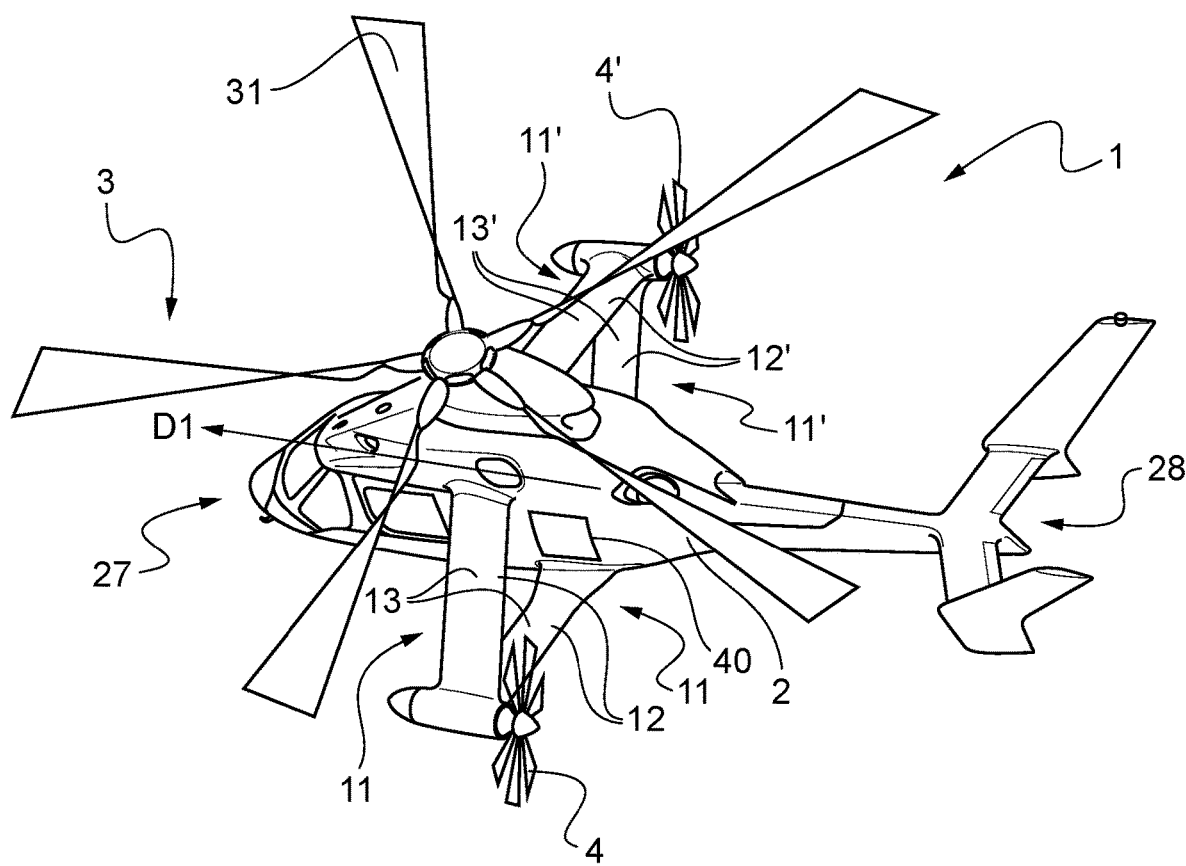
FIG. 1 is a perspective view of a hybrid rotorcraft of the invention.

As shown in FIG. 1, such a hybrid rotorcraft 1 conventionally includes a fuselage 2, at least one main rotor 3 provided with a plurality of blades 31, at least one pusher or puller propeller 4, 4', and at least two half-wings 11, 11' positioned on either side of an anteroposterior midplane of the fuselage 2. Furthermore, the main rotor 3 is configured to be driven in rotation by at least one power plant. The main rotor 3 can then rotate relative to the fuselage 2 at a speed of rotation NR so as to participate at least in providing lift, or indeed also in providing propulsion, for the hybrid rotorcraft 1.

As shown, the hybrid rotorcraft 1 may include two propellers 4, 4' arranged on respective ones of the half-wings 11, 11' at the free ends or tips of the at least two half-wings 11, 11'. In addition, the hybrid rotorcraft 1 may include two pairs of half-wings 11, 11'.

A first pair of left half-wings 11 is then arranged on a left side of the anteroposterior midplane of the fuselage 2, and a second pair of right half-wings 11' is arranged on the right side of the anteroposterior midplane of the fuselage 2. The left side or the right side is then defined relative to what is seen by the eyes of a pilot of the hybrid rotorcraft 1 sitting at the piloting station and looking straight ahead towards a front zone of the hybrid rotorcraft 1. In addition, a forward direction Dl can also be shown and be defined in a direction going from a rear zone 28 of the hybrid rotorcraft 1 towards a front zone 27 of the hybrid rotorcraft 1.

In addition, each left half-wing 11 includes, in particular, a left fixed structure 13 secured to the fuselage 2 and at least one left flap 12 that is mounted to move relative to the fixed left structure 13. Similarly, each right half-wing 11 includes a right fixed structure 13' secured to the fuselage 2 and at least one right flap 12' that is mounted to move relative to the right fixed structure 13'.

As shown, each left half-wing 11 or each right half-wing 11' may, in section, have an aerodynamic profile, and the left flap(s) 12 and the right flap(s) 12' may advantageously be arranged at a trailing edge of said aerodynamic profile.

Furthermore, such a hybrid rotorcraft 1 includes a control system 40 connected to the left flap(s) 12 of each left half-wing 11 and to the right flap(s) 12' of each right half-wing 11'.

Such a control system 40 is configured to generate automatically at least one first and at least one second deflection angle setpoints δw1, δw2 by which each left flap 12 is to be deflected relative to a facing left fixed structure 13 and by which each right flap 12' is to be deflected relative to a facing right fixed structure 13'. The control system 40 then enables said first deflection angle setpoint(s) δw1 and said second deflection angle setpoint(s) δw2 to be applied.

Figure 2:
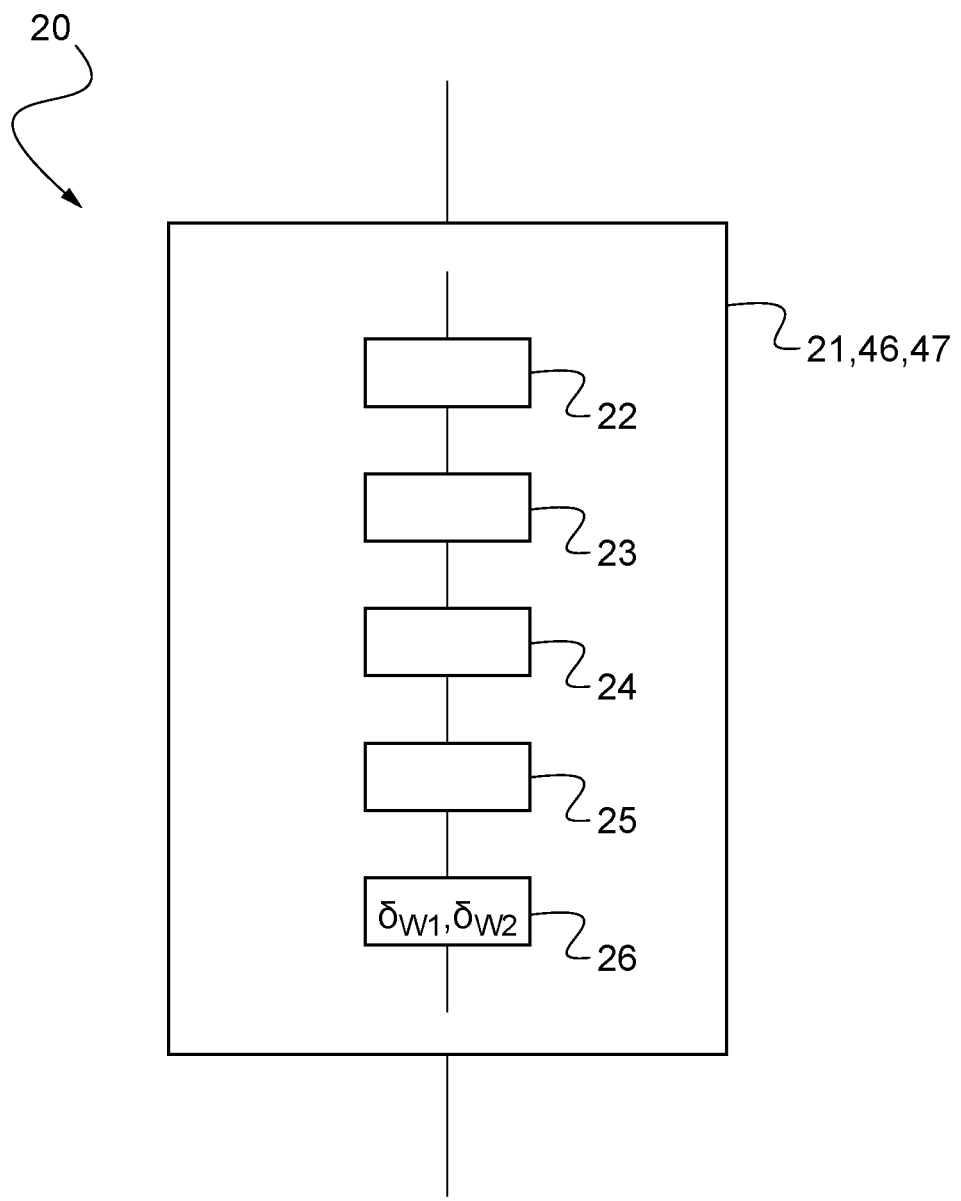
FIG. 2 is a flow chart showing a method of the invention, for automatically adjusting lift for a hybrid rotorcraft.
Figure 5:
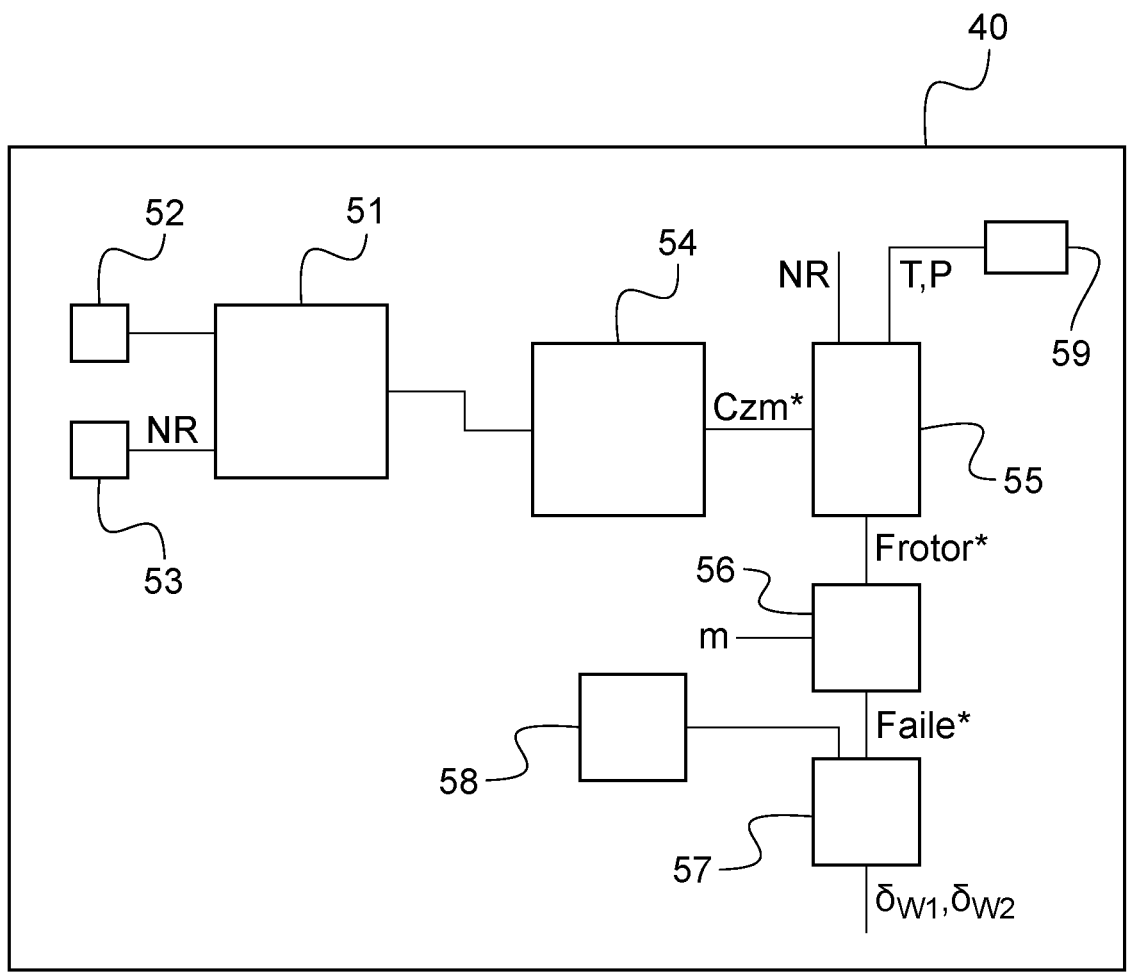
FIG. 5 is a block diagram of a control system of the invention.

Furthermore, such a control system 40 is shown in more detail in FIG. 5, and is configured to apply the method 20 as shown diagrammatically in FIG. 2.

Such a method 20 thus includes a step 21, 46, 47 consisting in automatically adjusting lift provided by at least two half-wings 11, 11' by varying the angular positioning of the left flap(s) 12 relative to the left fixed structure 13 and the angular positioning of the right flap(s) 12' relative to the right fixed structure 13'. In order to implement this automatic adjustment in the lift, this step 21, 46, 47 includes in particular a computation substep 22 using a first computer 51 of the control system 40 to compute a forward propulsion parameter as a function firstly of a True Air Speed (TAS) of the hybrid rotorcraft 1 as measured by a first speed sensor 52 and secondly of a current value of the speed of rotation NR of the main rotor 3 as measured by a second sensor 53.

The step 21, 46, 47 then includes a determination substep using a second computer 54 to determine a target lift coefficient Czm* for the main rotor 3. Such a target lift coefficient Czm* is then a function of the forward propulsion previously computed in the computation substep 22.

The step 21, 46, 47 then includes a computation substep for using a third computer 55 of the control system 40 to compute a target lift $F_{rotor}*$ to be provided by the main rotor 3. Such a target lift $F_{rotor}*$ is a function of the current value of the speed of rotation NR, of current atmospheric conditions, such as, for example, the pressure P and the temperature T of the air, and of the target lift coefficient Czm* computed during substep 23 by the second computer 54. Thus, one or more sensors 59 that are sensitive to the atmospheric conditions are then connected to the third computer 55 for transmitting measurements of the current values relating to atmospheric conditions.

Step 21, 46, 47 also includes a calculation substep 25 using a fourth computer 46 of the control system 40 to compute a target lift $F_{wing}*$ to be provided by the at least two half-wings 11, 11'. Such a target lift $F_{wing}*$ is a function of the target lift $F_{rotor}*$ computed during substep 24 and of a current value of the weight of the hybrid rotorcraft 1.

Furthermore, step 21, 46, 47 includes a determination substep 26 for determining at least one first deflection angle setpoint δw1 by which each of the at least one left flap 12 is to be deflected relative to the left fixed structure 13, and at least one second deflection angle setpoint δw2 by which each of the at least one right flap 12' is to be deflected relative to the left fixed structure 13'. These at least two deflection angle setpoints δw1, δw2 are then determined by a fifth computer 47 as a function of the target lift $F_{wing}*$ computed during substep 26 and of aerodynamic coefficients of the at least two half-wings 11, 11'.

These aerodynamic coefficients may be established in different ways such as by measurements in wind tunnels, by computer programs suitable for performing simulations and using, in particular, the principles of fluid mechanics, or by in-flight trials.

In addition, such aerodynamic coefficients may then be stored in a memory 48 and may also be corrected as a function of certain parameters for interactions between the main rotor 3 and each half-wing 11, 11', or indeed between a pusher or puller propeller 4, 4' and the half-wing 11, 11' to which said pusher or puller propeller 4, 4' is secured.

In addition, the various computers 41, 44, 45, 46, and 47 may, as shown in FIG. 5, be disjoint from one another or indeed be formed by a common computer. For example, this computer or each of these computers 41, 44, 45, 46 and 47 may comprise at least one processor and at least one memory, at least one integrated circuit, at least one programmable system, or at least one logic circuit, these examples not limiting the scope given to the expression "computer". The term "processor" may be used equally well to mean a central processing unit (CPU), a graphics processing unit (GPU), a digital signal processor (DSP), a microcontroller, etc.

Figure 3:
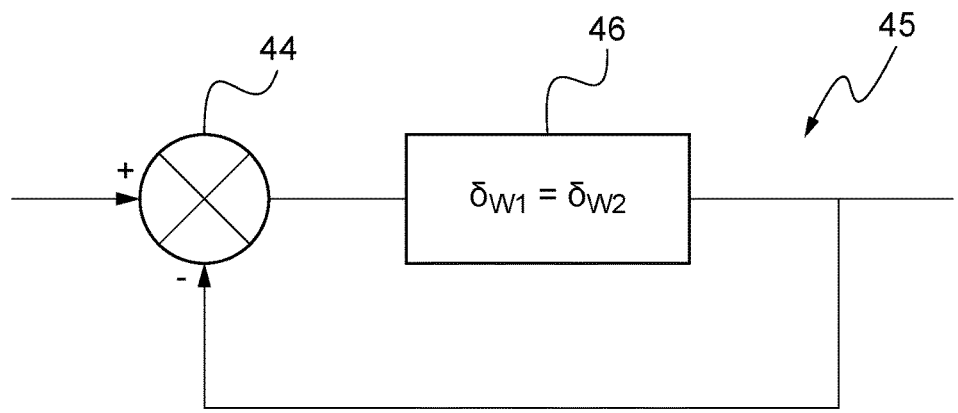
FIG. 3 is a flow chart showing a first operating mode of the method of the invention.
Figure 4:
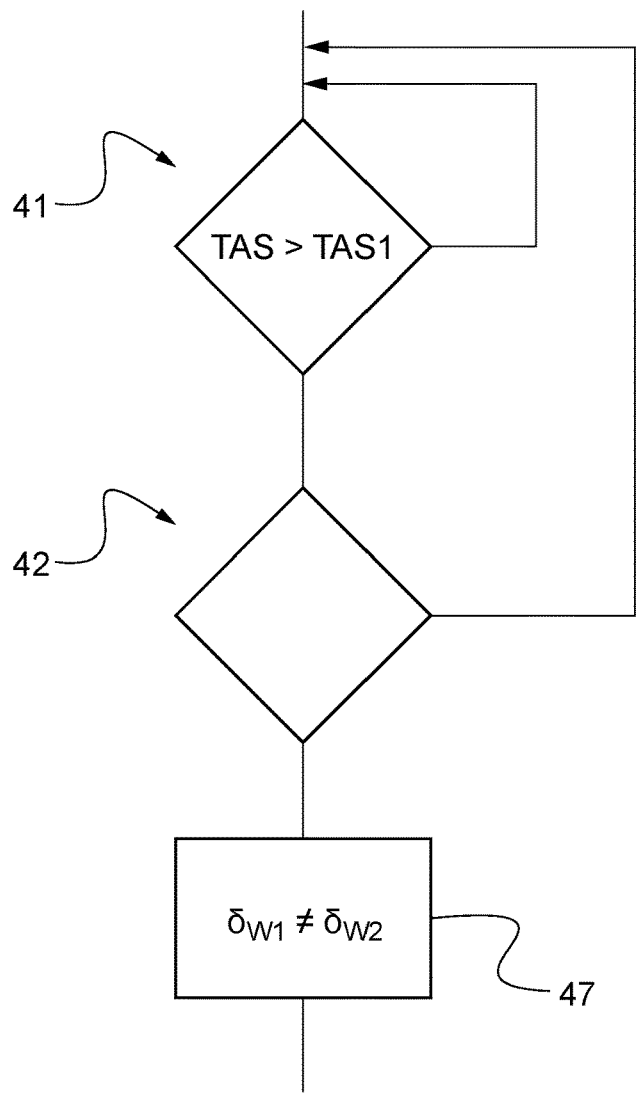
FIG. 4 is a flow chart showing a second operating mode of the method of the invention.

In addition, as shown in FIG. 3, in a first operating mode of the method 20, step 46 may enable the lift provided by the at least two half-wings 11, 11' to be adjusted symmetrically about the anteroposterior midplane of the fuselage 2.

In this situation, the one or more first deflection angle setpoints δw1 for the left flap(s) are then equal to the one or more second deflection angle setpoints δw2 for the right flap(s) 12'.

It is then possible to measure a current value of lift provided by the main rotor 3 and the control system 40 can control a closed-loop regulation 45 for symmetrically adjusting the lift provided by the at least two half-wings 11, 11'.

In addition, the current value of the lift provided by the at least two half-wings 11, 11' may be computed on the basis of the measurement of the current value of lift provided by the main rotor 3, and then by subtracting the weight of the hybrid rotorcraft from said current value of lift provided by the main rotor 3.

A comparator 44 then enables an input lift setpoint, e.g. to be provided by the at least two half-wings 11, 11', to be compared with an input current value of the lift provided by the at least two half-wings 11, 11'.

Alternatively, and in a second operating mode of the method 20, step 47 may enable the lift provided by the at least two half-wings 11, 11' to be adjusted asymmetrically about the anteroposterior midplane of the fuselage 2. In this situation, the at least two deflection angle setpoints δw1, δw2 are thus distinct from each other.

In this situation, an activation test may be performed with comparison steps 41 and 42.

Thus, a first comparison step 41 enables the True Air Speed (TAS) of the hybrid rotorcraft 1 to be compared with a predetermined threshold value TAS1. When the TAS is greater than said predetermined threshold TAS1, the control system 40 then tests flight parameters of the hybrid rotorcraft 1.

A second comparison step 42 then serves to check that the hybrid rotorcraft 1 is in a flight phase that is stabilized by comparing said flight parameters of the hybrid rotorcraft 1 with stored values that, for example, are representative of the attitudes and of the rate of climb or of the rate of descent of the hybrid aircraft 1. These flight parameters of the hybrid rotorcraft 1 are then measured in real time, e.g. by sensors such as inclinometers or accelerometers that are mounted on the hybrid rotorcraft 1. Furthermore, these flight parameters may be obtained by means of an Attitude and Heading Reference System (AHRS). Indeed, such a system may equip a hybrid rotorcraft and include three accelerometers serving to measure longitudinal accelerations, three rate gyros serving to measure angular accelerations and a triaxial fluxgate serving to measure heading references.

When both of the comparison steps 41 and 42 are positively checked, the activation test is validated and step 47 can then be implemented to adjust the lift provided by the at least two half-wings 11, 11' asymmetrically.

In addition, such a step 47 may be implemented in various situations and, for example so that a lateral cyclic pitch of the blades 31 of the main rotor 3 is equal to a setpoint lateral cyclic pitch, so that a lateral bending moment of a mast of the main rotor 3 is equal to a setpoint lateral bending moment during the phase of stabilized flight and/or in the event of malfunctioning of any one of the at least one left flap 12 and of the at least one right flap 12'.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention.

What is claimed is:
1. A method of automatically adjusting lift provided for a hybrid rotorcraft, the hybrid rotorcraft including:
 a fuselage;
 at least one main rotor provided with a plurality of blades, the at least one main rotor rotating relative to the fuselage at a speed of rotation NR;
 at least one pusher or puller propeller; and
 at least two half-wings positioned on either side of an anteroposterior midplane of the fuselage, the at least two half-wings including firstly at least one left half-wing having a left fixed structure secured to the fuselage and at least one left flap mounted to move relative to the left fixed structure, and secondly at least one right half-wing having a right fixed structure secured to the fuselage and at least one right flap mounted to move relative to the right fixed structure;

the method including, during a nominal flight phase, a step consisting in automatically adjusting lift provided by the at least two half-wings;
wherein the step includes a succession of substeps consisting in:
  computing a forward propulsion parameter as a function firstly of a true air speed TAS and secondly of a current value of the speed of rotation NR;
  determining a target lift coefficient $Czm^*$ for the main rotor, the target lift coefficient $Czm^*$ being a function of the forward propulsion parameter;
  computing target lift $F_{rotor}^*$ to be provided by the main rotor, the target lift $F_{rotor}^*$ to be provided by the main rotor being a function of the current value of the speed of rotation NR, of current atmospheric conditions, and of the target lift coefficient $Czm^*$;
  computing target lift $F_{wing}^*$ to be provided by the at least two half-wings, the target lift $F_{wing}^*$ to be provided by the at least two half-wings being a function of the target lift $F_{rotor}^*$ to be provided by the main rotor and of a current value of the weight of the hybrid rotorcraft; and
determining at least one first deflection angle setpoint $\delta w1$ by which the at least one left flap is to be deflected relative to the left fixed structure and at least one second deflection angle setpoint $\delta w2$ by which the at least one right flap is to be deflected relative to the right fixed structure, the at least one first and at least one second deflection angle setpoints $\delta w1$, $\delta w2$ being functions of the target lift $F_{wing}^*$ to be provided by the at least two half-wings and of aerodynamic coefficients of the at least two half-wings.

2. The method according to claim 1,
wherein the lift provided by the at least two half-wings is adjusted when the following condition is satisfied:

$$\frac{Frotor*}{Frotor* + Fwing*} > S$$

where S is a predetermined threshold value representative of a minimum allowable contribution from the main rotor to the total lift provided for the hybrid rotorcraft.

3. The method according to claim 1,
wherein the lift provided by the at least two half-wings is adjusted when the at least one first setpoint $\delta w1$ is strictly less than a first predetermined threshold value $\delta wmax1$ representative of a maximum allowable deflection for the at least one left flap and the at least one second setpoint $\delta w2$ is strictly less than a second predetermined threshold value $\delta wmax2$ representative of a maximum allowable deflection for the at least one right flap.

4. The method according to claim 1,
wherein the target lift $F_{rotor}^*$ to be provided by the main rotor is computed by means of the following formula:

$$Frotor* = \frac{Czm* \times \rho \times b \times c \times R \times U^2}{6}$$

where:
  $\rho$ is the density (mass per unit volume) of the surrounding outside air;
  b is the number of blades in the plurality of blades of the at least one main rotor;
where c is a chord of an aerodynamic profile of the blades;
  R is a radius of the at least one main rotor; and
  U is a tangential speed at the tips of the blades.

5. The method according to claim 1,
wherein, during a phase of flight during which the at least one main rotor is autorotating, and which is distinct from the nominal flight phase, a first predetermined threshold value $\delta wmax1$ representative of a maximum allowable deflection for the at least one left flap is assigned to the at least one first setpoint $\delta w1$, and a second predetermined threshold value $\delta wmax2$ representative of a maximum allowable deflection for the at least one right flap is assigned to the at least one second setpoint $\delta w2$.

6. The method according to claim 1,
wherein the lift provided by the at least two half-wings is adjusted symmetrically about the anteroposterior midplane of the fuselage, the at least one first setpoint $\delta w1$ being equal to the at least one second setpoint $\delta w2$.

7. The method according to claim 6,
wherein a current value of lift provided by the main rotor is measured, and a closed-loop regulation is controlled so as to adjust the lift provided by the two half-wings symmetrically.

8. The method according to claim 1,
wherein, when firstly the true air speed TAS is greater than a predetermined threshold value TAS1 and secondly flight parameters of the hybrid rotorcraft enable checking to be performed to check that the hybrid rotorcraft is in a stabilized flight phase, the lift provided by the at least two half-wings is adjusted asymmetrically about the anteroposterior midplane of the fuselage, the at least one first setpoint $\delta w1$ being distinct from the at least one second setpoint $\delta w2$.

9. The method according to claim 8,
wherein the lift provided by the at least two half-wings is adjusted asymmetrically so that a lateral cyclic pitch of the blades of the main rotor is equal to a setpoint lateral cyclic pitch.

10. The method according to claim 8,
wherein the lift provided by the at least two half-wings is adjusted asymmetrically so that a lateral bending moment of a mast of the main rotor is equal to a setpoint lateral bending moment during the stabilized flight phase.

11. The method according to claim 8,
wherein the lift provided by the at least two half-wings is adjusted asymmetrically in the event of malfunctioning of any one of the at least one left flap and of the at least one right flap.

12. A hybrid rotorcraft including:
a fuselage;
at least one main rotor provided with a plurality of blades, the at least one main rotor rotating relative to the fuselage at a speed of rotation NR;
at least one pusher or puller propeller;
at least two half-wings positioned on either side of an anteroposterior midplane of the fuselage, the at least two half-wings including firstly at least one left half-wing having a left fixed structure secured to the fuselage and at least one left flap mounted to move relative to the left fixed structure, and secondly at least one right half-wing having a right fixed structure secured to the fuselage and at least one right flap mounted to move relative to the right fixed structure; and
a control system connected to the at least one left flap and to the at least one right flap, the control system being configured to generate automatically at least one first deflection angle setpoint $\delta w1$ by which the at least one left flap is to be deflected relative to the left fixed structure, and at least one second deflection angle setpoint $\delta w2$ by which the at least one right flap is to be deflected relative to the right fixed structure;

wherein the control system is configured to apply the method according to claim 1.

\* \* \* \* \*